United States Patent Office 2,720,507
Patented Oct. 11, 1955

2,720,507

ORGANO-METALLIC TIN CATALYSTS FOR PREPARATION OF POLYESTERS

John R. Caldwell, Kingsport, Tenn., assignor to Eastman Kodak Company, Rochester, N. Y., a corporation of New Jersey No Drawing. Application October 3, 1952,
Serial No. 313,078

13 Claims. (Cl. 260—75)

This invention relates to a process for preparing polyesters which comprises condensing a diester of a dicarboxylic acid with a polyhydroxy compound in the presence of at least one of a group of novel catalytic condensing agents which are organic derivatives of tin and which are defined below. These novel catalytic condensing agents can be advantageously employed in the preparation of linear polyesters wherein the dicarboxylic acid is an aromatic compound which does not contain any ethylenic (olefinic) unsaturation and the polyhydroxy compound is a dihydroxy compound. In preparing such linear polyesters it is advantageous to conduct the condensation in an inert atmosphere at an elevated temperature which is increased during the course of the condensation up to a temperature of from about 225° to about 310° C., the condensation being conducted during the latter stages thereof at a very low subatmospheric pressure.

This application contains subject matter disclosed to some extent in a copending application, Serial No. 143,594, filed February 10, 1950, by J. R. Caldwell, now U. S. Patent No. 2,614,120, dated October 14, 1952. This application also contains subject matter disclosed in other copending applications filed on even date herewith by J. R. Caldwell, Serial Nos. 313,061 through 313,071.

Various polyesters of dicarboxylic acids and polyhydroxy compounds are well known in the prior art and have been used, for example, in the manufacture of paints and varnishes. Moreover, prior art disclosures set forth various linear condensation polyesters derived from dihydroxy compounds and dibasic acids such as terephthalic acid which are capable of being drawn into fibers showing by characteristic X-ray patterns, orientation along the fiber axis. However, many of these linear polyesters possess a relatively low melting point and a fairly considerable solubility in various solvents whereby they are of restricted utility, especially in the textile field. These polyesters vary considerably in their characteristics, depending on the particular dicarboxylic acid and the particular polyhydroxy compound employed. Generally speaking, these polyesters have various physical characteristics which are not as satisfactory as could be desired.

The preparation of polyesters is well known in the prior art and involves the reaction of a dibasic dicarboxylic acid with a dihydric or polyhydric alcohol. It is advantageous to employ esters of the dicarboxylic acid whereby ester interchange takes place with the glycol or polyhydric alcohol to form a polyester and an alcohol. When using the ester interchange method, the time required to form the polyesters is generally considerably less than when the free dicarboxylic acid is employed. The long chain in the polyester is built up by a series of ester interchange reactions wherein the glycol displaces a relatively low-boiling alcohol component of the acid ester to form a glycol ester. During the last stages of the reaction, it is generally desirable to heat the condensing reaction mixture to a temperature of about 225°–275° C. or higher in order to maintain the fluid state. For this reason, the properties of the catalytic condensing agent are very important.

A desirable catalytic condensing agent must be active enough to promote ester interchange at a temperature below the boiling point of the glycol or other polyhydric alcohol. At the same time, the catalyst must be stable at temperatures of 225°–310° or even higher if necessary. Furthermore, the catalyst must not cause decomposition or degradation of the polyester at these high temperatures.

In accordance with this invention, it has been found that certain compounds are especially valuable for use as catalytic condensing agents in the preparation of high melting linear polyesters. These catalysts are tin compounds containing at least one organic radical. These catalysts include compounds of both divalent or tetravalent tin which have the general formulas set forth below:

A. $M_2(Sn(OR)_4)$
B. $MH(Sn(OR)_4)$
C. $M'(Sn(OR)_4)$
D. $M'(HSn(OR)_4)_2$
E. $M_2(Sn(OR)_6)$
F. $MH(Sn(OR)_6)$
G. $M'(Sn(OR)_6)$
H. $M'(HSn(OR)_6)_2$
I. $Sn(OR)_2$
J. $Sn(OR)_4$
K. $SnR'_2$
L. $SnR'_4$
M. $R'_2SnO$

N.
$$\begin{array}{c} R \\ \diagdown \\ \end{array} \begin{array}{c} \\ Sn \\ \end{array} \begin{array}{c} OR \\ \diagup \\ \end{array}$$
$$\begin{array}{c} \diagup \\ R \\ \end{array} \begin{array}{c} \\ \\ \end{array} \begin{array}{c} \diagdown \\ OM \\ \end{array}$$

O.
$$\begin{array}{c} R \\ \diagdown \\ \end{array} \begin{array}{c} \\ Sn \\ \end{array} \begin{array}{c} OR \\ \diagup \\ \end{array}$$
$$\begin{array}{c} \diagup \\ R \\ \end{array} \begin{array}{c} \\ \\ \end{array} \begin{array}{c} \diagdown \\ OR \\ \end{array}$$

P.
$$\begin{array}{c} R' \\ \diagdown \\ \end{array} \begin{array}{c} \\ Sn \\ \end{array} \begin{array}{c} Cl \\ \diagup \\ \end{array}$$
$$\begin{array}{c} \diagup \\ R' \\ \end{array} \begin{array}{c} \\ \\ \end{array} \begin{array}{c} \diagdown \\ Cl \\ \end{array}$$

Q.
$$\begin{array}{c} R \\ \diagdown \\ \end{array} \begin{array}{c} \\ Sn \\ \end{array} \begin{array}{c} OAc \\ \diagup \\ \end{array}$$
$$\begin{array}{c} \diagup \\ R \\ \end{array} \begin{array}{c} \\ \\ \end{array} \begin{array}{c} \diagdown \\ OAc \\ \end{array}$$

wherein M is an alkali metal, e. g. lithium, sodium, or potassium, M' is an alkaline earth metal such as Mg, Ca or Sr, each R represents an alkyl radical containing from 1 to 8 carbon atoms, each R' radical represents a substituent selected from those consisting of alkyl radicals containing from 1 to 8 carbon atoms (i. e. R radicals) and aryl radicals of the benzene series containing from 6 to 9 carbon atoms (e. g. phenyl, tolyl, benzyl, phenylethyl, etc., radicals), and Ac represents an acyl radical derived from an organic acid containing from 2 to 18 carbon atoms (e. g. acetyl, butyryl, lauroyl, benzoyl, stearoyl, etc.).

These novel catalysts can be advantageously employed in processes for preparing polyesters, which processes are described below. These novel catalysts are effective only when substantially anhydrous conditions are employed and no free acid is present to a sufficiently significant extent to destroy the catalyst compound; thus, when free acids are employed the acids are first reacted with a hydroxy compound (preferably the polyhydroxy compound to be employed in the polyesterification process) before the novel catalyst of this invention is added.

The novel bimetallic alkoxide catalysts can be made as described by Meerwein, Ann. 476, 113 (1929). As shown by Meerwein, these catalysts are not merely mixtures of the two metallic alkoxides. They are definite compounds having a salt-like structure. These are the compounds depicted above by the Formulas A through H. Those not specifically described by Meerwein can be prepared by procedures analogous to the working examples and methods set forth by Meerwein.

The other tin compounds can also be made by various methods such as those described in the following literature:

For the preparation of diaryl tin dihalides (Formula P) see Ber. 62, 996 (1929); J. Am. Chem. Soc. 49, 1369 (1927). For the preparation of dialkyl tin dihalides (Formula P) see J. Am. Chem. Soc. 47, 2568 (1925); C. A. 41, 90 (1947). For the preparation of diaryl tin oxides (Formula M) see J. Am. Chem. Soc. 48, 1054 (1926). For the preparation of tetraaryl tin compounds (Formula K) see C. A. 32, 5387 (1938). For the preparation of tin alkoxides (Formula J) see C. A. 24, 586 (1930). For the preparation of alkyl tin salts (Formula Q) see C. A. 31, 4290. For the preparation of alkyl tin compounds (Formula K and L) see C. A. 35, 2470 (1941); C. A. 33, 5357 (1939). For the preparation of alkyl aryl tin (Formulas K and L) see C. A. 31, 4290 (1937); C. A. 38, 331 (1944). For the preparation of other tin compounds not covered by these citations see "Die Chemie der Metal-Organishen Verbindungen," by Krause and V. Grosse, published in Berlin, 1937, by Gebroder-Borntrager.

The tin alkoxides (Formulas I and J) and the bimetallic alkoxides (Formulas A through H) contain R substituents which can represent both straight chain and branched chain alkyl radicals, e g. diethoxide, tetramethoxide, tetrabutoxide, tetra-tert-butoxide, tetrahexoxide, etc.

The alkyl derivatives (Formulas K and L) contain one or more alkyl radicals attached to a tin atom through a direct C-Sn linkage, e. g. dibutyl tin, dihexyl tin, tetrabutyl tin, tetraethyl tin, tetramethyl tin, diocyl tin, etc. Two of the tetra-alkyl radicals can be replaced with an oxygen atom to form compounds having Formula M, e. g. dimethyl tin oxide, dimethyl tin oxide, dibutyl tin oxide, diheptyl tin oxide, etc.

Complexes can be formed by reacting dialkyl tin oxides with alkali metal alkoxides in an alcohol solution to form compounds having Formula N, which compounds are especially useful catalysts, e. g. react dibutyl tin oxide with sodium ethoxide, etc. The actual structure of compounds depicted by Formula N has not been definitely established. This formula is intended to represent the reaction products described. Tin compounds containing alkyl and alkoxy radicals are also useful catalysts (see Formula O), e. g. diethyl tin diethoxide, dibutyl tin dibutoxide, dihexyl tin dimethoxide, etc.

Salts derived from dialkyl tin oxides reacted with carboxylic acids or hydrochloric acid are also of particular value as catalysts, see Formulas P and Q. Examples of these catalytic condensing agents include dibutyl tin diacetate, diethyl tin dibutyrate, dibutyl tin dilauroate, dimethyl tin dibenzoate, dibutyl tin dichloride, diethyl tin dichloride, dioctyl tin dichloride, dihexyl tin distearate, etc.

The tin compounds having Formulas K, L and M can be prepared wherein one or more of the R' radicals represents an aryl radical of the benzene series, e. g. phenyl, tolyl, benzyl, etc. Examples include diphenyl tin, tetraphenyl tin, diphenyl dibutyl tin, ditolyl diethyl tin, diphenyl tin oxide, dibenzyl tin, tetrabenzyl tin, di(β-phenylethyl) tin oxide, dibenzyl tin oxide, etc.

The novel catalysts of this invention give a very rapid reaction rate at all stages of the polyesterification process, including the final step where the molecular weight is built up. They are particularly valuable for the preparation of high melting polyesters from 1,6 hexanediol and 1,5-pentanediol. It is well known that these glycols have a tendency to decompose at temperatures above 250–260° C. and hence are difficult to use. With the novel catalysts described above polyester reactions employing these glycols can be carried out at temperatures up to 300° C. or even higher without excessive decomposition.

The novel catalysts can, in general, be employed for the preparation of substantially all polyesters involving an ester interchange reaction between a dicarboxylic acid ester and a glycol or glycol ester. The catalysts are especially valuable for the preparation of polyesters that melt above about 240° C., as for example, polyethylene terephthalate. The process of the invention is applicable to all of the polyesters described herein.

By employing the novel catalysts of this invention, the reaction rate of the polyesterification process can be increased by a factor which is generally from about 2 to 5 times the reaction rate obtainable when catalysts known in the prior art are employed. The tin compounds of this invention give reaction rates that are 5 to 10 times faster than the reaction rates when metallic tin is used as alluded to in the prior art. Moreover, the novel catalysts of this invention have the valuable characteristic of minimizing side reactions which have the tendency of causing considerable degradation of the polyester products at the relatively high temperatures employed in preparing highly polymeric polyesters. Furthermore, by employing these novel catalysts to increase the rate of condensation, the time available for possible decomposition of the high molecular weight polyester molecules being formed at high temperatures is appreciably reduced. Thus, by increasing the reaction rate, the time required to make a polyester is reduced which is quite important because at 250°–300° C. the degree of color formation and extent of deleterious side reactions is proportional to the time of heating.

The polyesters produced when employing these novel catalysts have greatly improved properties as compared to products obtained employing catalysts known in the prior art. The molecular weight is considerably higher whereby highly polymeric polyesters are obtained. The color of the polyesters obtained is excellent; the products can therefore be employed for purposes calling for white or colorless materials. The physical properties of the polyesters obtained are also superior. At high temperatures there is a great improvement in the inherent viscosities of linear polyesters which are suitable for melt spinning or extrusion whereby fibers, films, etc., can be produced having properties superior to those obtainable with known catalysts.

The herein described novel catalysts are especially valuable for the preparation of polyesters employing diesters of p,p'-sulfonyl dibenzoic acid as described in copending applications filed on even date herewith by J. R. Caldwell, Serial Nos. 313,061 through 313,068. Many of these polyesters are very high melting and the reaction must often be carried out at a temperature of 280°–300° C. or higher. It has been found that relatively few catalysts are effective at this temperature other than those described in this application.

It is an object of this invention to provide new and improved catalytic condensing agents for promoting the formation of improved polyesters in processes involving ester interchange and alcoholysis. A further object of this invention is to provide a new and improved method for the preparation of polyesters wherein such new and improved catalysts are employed. Other objects will become apparent elsewhere in this specification.

A broad aspect of this invention relates to a process for preparing a polyester which comprises condensing under substantially anhydrous conditions at an elevated temperature in an inert atmosphere a diester of a dicarboxylic acid with from about 1 to about 10 equivalent proportions of a polyhydroxy compound, in the presence of a tin compound containing at least one organic radical as a catalytic condensing agent, especially those compounds of tin whose formulas have been depicted above.

More specifically, this invention relates to a process for preparing a polyester comprising (A) condensing under substantially anhydrous conditions an aromatic dicarboxylic acid diester having the formula:

R₁OOC—R₂—X—R₃—COOR₄ wherein R₁ and R₄ each represents a substituent selected from the group consisting of an alkyl radical containing from 1 to 10 carbon atoms and an omega-hydroxyalkyl radical containing from 2 to 12 carbon atoms, R₂ and R₃ each represents (CH₂)ₙ₋₁ wherein $n$ is a positive integer of from 1 to 5 inclusive and X represents a divalent aromatic radical selected from the group having the following formulas:

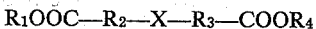

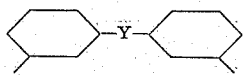

and

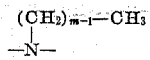

wherein Y represents a divalent radical selected from the group consisting of

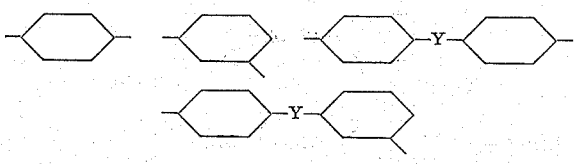

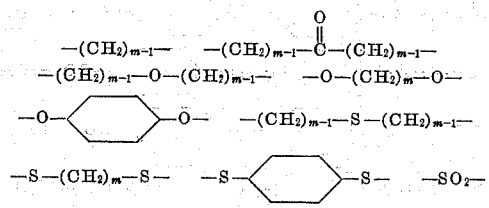

and

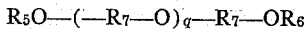

wherein $m$ is a positive integer of from 1 to 5 inclusive, (B) with an alpha, omega-dioxy compound selected from the group consisting of those compounds having the following formulas:

R₅—O—(CH₂)ₚ—O—R₆ and

R₅O—(—R₇—O)_q—R₇—OR₆ wherein $p$ represents a positive integer of from 2 to 12 inclusive, R₅ and R₆ each represents a substituent selected from the group consisting of a hydrogen atom and an acyl radical containing from 2 to 4 carbon atoms, R₇ represents an alkylene radical containing from 2 to 4 carbon atoms and $q$ represents a positive integer of from 1 to 10 inclusive, the alpha, omega-dioxy compound being employed in such a proportion that there is at least an equivalent amount of alpha and omega oxy substituents in proportion to the carbalkoxy substituents in the overall combination of the aromatic diesters and the alpha, omega-dioxy compounds, (C) in the presence of a condensing agent selected from the group consisting of the novel catalysts set forth above, (D) at an elevated temperature which is increased gradually during the course of the condensation up to a temperature of from about 225° to about 310° C., (E) the condensation being conducted in an inert atmosphere, (F) and conducting the condensation at a very low pressure of the inert atmosphere during the latter part of the condensation.

Advantageously, the condensing agent is employed in an amount of from about 0.005% to about 0.2% based on the weight of the aromatic dicarboxylic acid diester. Higher and lower proportions can also be employed.

Advantageously, the alpha, omega-dioxy compound is employed in such a proportion that there are from about 1.2 to about 3 alpha and omega oxy substituents in proportion to the carbalkoxy substituents in the overall combination of the aromatic diesters and the alpha, omega-dioxy compounds. Higher (e. g. 10) and lower (e. g. 1) proportions can also be employed.

Since the alpha, omega-dioxy compounds which can be employed in accordance with this invention are most advantageously alpha, omega-dihydroxy compounds and in order to facilitate the phraseology which is employed in this specification, such compounds will hereinafter be referred to as polyhydroxy or dihydroxy compounds although it is to be understood that the alpha, omega-dioxy compounds of the type described above are intended to be covered by the term dihydroxy compounds or the term polyhydroxy compounds as such terms are employed herein.

Advantageously, the temperature employed during the earlier part of the condensation is from about 150° to about 220° C. Higher and lower temperatures can also be employed.

Advantageously, the low pressure defined under (F) is less than about 15 mm. of Hg pressure (preferably less than 5 mm.). However, somewhat higher pressures can also be employed.

Most advantageously, the aromatic dicarboxylic acid diester is a diester of p,p'-sulfonyl dibenzoic acid or terephthalic acid and the polyhydroxy compound is a polymethylene glycol.

This invention also includes processes as described above whereby polyesters can be prepared by replacing a part of the described aromatic dibasic acid diester with an ester of a replacement acid which can be an aliphatic dibasic acid, e. g. carbonic acid, oxalic acid, succinic acid, adipic acid, sebacic acid, α,α-dimethylglutaric acid, dimethylmalonic acid, diglycollic acid, β-oxydipropionic acid, γ-oxydibutyric acid, maleic acid, fumaric acid, itaconic acid, etc. Similarly, other esterified acidic modifiers can also be incorporated in conjunction with or in lieu of these replacement acid esters, e. g. linoleic acid, linolenic acid, fatty acids of linseed oil, soybean oil, cottonseed oil, tung oil, etc. These novel tin catalysts are of great value in the preparation of polyesters containing adipic acid. In general, the catalysts described in the prior art given deeply colored polyesters when adipic acid is used at temperatures higher than 230° C. The tin catalysts described herein give high molecular weight, substantially colorless polyesters with adipic acid at temperatures as high as 280° C.

The process described above for the general practice of this invention need not be appreciably modified when various partial replacement acid esters are employed in conjunction with the aromatic dibasic acid esters except when they are unsaturated and tend to form insoluble and infusible products due to cross-linkage effects, in which event the process described hereinabove is advantageously terminated at an intermediate temperature of about 250° C. before the pressure is reduced whereby products are obtained which can be called soluble intermediate polyesters which are useful in preparing protective coatings. The various polyesters containing replacement acid esters as described in this paragraph can be prepared according to procedures similar to those described in copending applications filed on even date herewith by J. R. Caldwell, Serial Nos. 313,062 through 313,066.

Polyesters can also be prepared in accordance with this invention by replacing a part of the described dihydroxy compound with what can be called a polyhydroxy compound which contains 3 or more hydroxy radicals, e. g. glycerol, sorbitol, pentaerythritol, dipentaerythritol, β-methylglycerol, 2-methyl-2-hydroxymethyl-1,3-propanediol, 1,2,4-trihydroxybutane, etc. In the preparation of polyesters employing these polyhydroxy compounds, the reaction mixture is not generally heated to the high temperatures under reduced pressure as described hereinabove since the product would become insoluble and infusible due to cross-linking of the molecules; hence, the process is halted at about 250° C. or less prior to the reduction in pressure of the inert atmosphere. Various solutions can then be prepared from these soluble polyester products which can then be cast into films or otherwise used in protective coating compositions. In preparing such soluble polyesters it is generally advantageous to employ an unsaturated aliphatic dibasic acid diester in lieu of a part of the described aromatic dibasic acid diesters, e. g. maleic, fumaric and itaconic diesters. The various polyesters containing replacement polyhydroxy compounds as described in this paragraph can be prepared according to procedures similar to those described in a copending application filed on even date herewith by J. R. Caldwell, Serial No. 313,069.

The dihydroxy or polyhydroxy compounds defined above may not actually contain any free hydroxy radicals since they may be in esterified form as indicated by the formulas of the dihydroxy compounds set forth above. However, these hydroxy or substituted hydroxy radicals are referred to generally as hydroxy or substituted hydroxy radicals are referred to generally as hydroxy radicals or substituents. Each diester is considered as containing two carbalkoxy radicals as that term is employed in the definition of the process as described above since $R_1$ and $R_4$ may be alkyl radicals, or omega-hydroxyalkyl radicals. Even when the process is preceded by the preliminary step described below employing free acids, the term carbalkoxy radicals in the description of the process is intended to encompass such free carboxy radicals.

Furthermore, this invention covers processes as defined above wherein the aromatic dicarboxylic acid diester is formed by a preliminary step comprising condensing an aromatic dicarboxylic acid having the formula:

$$HOOC—R_2—X—R_3—COOH$$

(wherein $R_2$, $R_3$ and X are defined under (A) in the above-described process), with a polyhydroxy compound which is defined above under (B) and is employed in the proportions set forth under (B), at an elevated temperature, after which preliminary step the novel catalytic condensing agent which is defined under (C) is added and the condensation is completed as defined under (D), (E) and (F). Advantageously, the elevated temperature employed during the preliminary step is substantially that at which reflux conditions subsist; however, higher and lower temperatures can also be used. Advantageously, as indicated hereinbefore, the polyhydroxy compound is employed in such a proportion that there are from about 1.2 to about 3 hydroxy substituents in proportion to the acid substituents in the overall combination of the aromatic diester and the polyhydroxy compound.

In preparing polyesters, especially linear highly polymeric polyesters, it is important to exclude oxygen and moisture at all stages of the condensation, particularly during the latter stages thereof. An inert atmosphere is employed to exclude oxygen; such atmospheres include helium, hydrogen, nitrogen etc. The reacting materials employed in the condensation are advantageously substantially anhydrous; however, if water is initially present or is formed during the course of the condensation, it can be substantially completely removed prior to the final stages of the condensation by operating in accordance with the specified process or otherwise.

Examples of aromatic dicarboxylic acid diesters which can be employed as defined above under (A) include the β-hydroxyethyl diester of p,p′-sulfonyl dibenzoic acid, p,p′-sulfonyl dibenzoic acid dibutyl ester, m,p′-sulfonyl dibenzoic acid dipropyl ester, m,m′-sulfonyl dibenzoic acid dihexyl ester, methyl terephthalate, hexyl terephthalate, isopropyl terephthalate, as well as various esters having the following formulas:

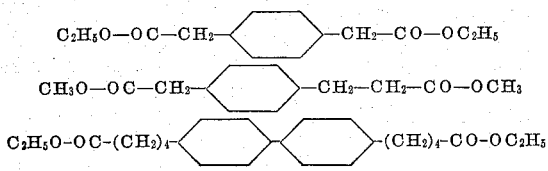

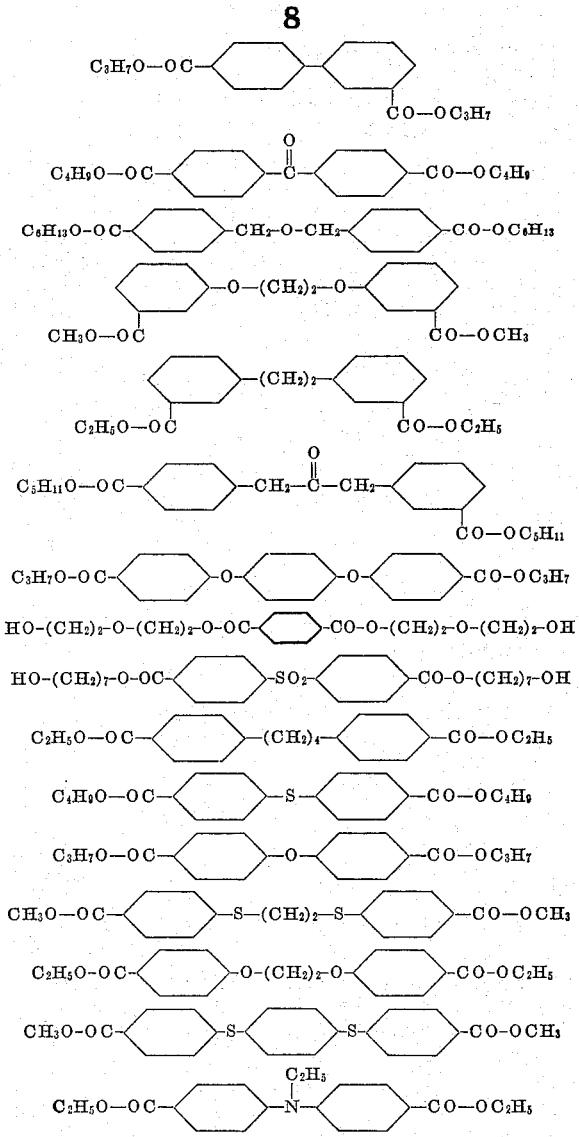

et cetera.

The dihydroxy compounds which can be employed to form highly polymeric linear polyesters are straight-chain alkane diols, viz. polymethylene glycols, wherein the hydroxy radicals are positioned at the two ends of the alkylene chain. Examples of such glycols include ethylene glycol, 1,3-propylene glycol, 1,4-butylene glycol, 1-6-hexylene glycol, 1,10-decamethylene glycol, 1,12-dodecamethylene glycol, etc. As indicated above, mono or diesters of these glycols can also be employed. Thus, the acetates, propionates and butyrates are examples of such esters. The defined ether glycols can be employed either in lieu of the polymethylene glycols or in conjunction therewith as modifiers. Examples of ether glycols include diethylene glycol, triethylene glycol, tetraethylene glycol, bis (4-hydroxybutyl) ether, bis (3-hydroxypropyl) ether, etc.

Valuable fibers can be advantageously prepared employing the higher melting polyesters which can be produced according to the procedures described herein. Preferably no aliphatic ether glycol is employed when fibers are to be prepared. Furthermore, the aromatic acid diesters should ordinarily contain only p,p′ linkages when highly polymeric linear polyesters are desired. However, on the other hand, valuable polyesters can be prepared employing aliphatic ether glycols without any polymethylene glycol although the product obtained will not be suitable for forming useful fibers. The same applies to the employment of aromatic diesters containing linkages in other than the para positions.

The catalytic condensing agents which can be employed have been described above. From about 0.005% to about 0.2% of such catalysts based on the weight of the diesters being condensed can be employed. Higher or lower percentages can also be employed. Generally, from about 0.01% to about 0.06% of the catalytic condensing agent can be advantageously employed based on the weight of the various diesters being condensed.

The temperature at which polyesterification can be conducted is dependent upon the specific reactants involved in any given reaction. In general, the reaction mixture can be heated with agitation at from about 150° to about 220° C. for from approximately one to three hours in an inert atmosphere (e. g. nitrogen or hydrogen); the mixture can then be heated with agitation at from about 225°–240° to about 280°–310° C. in the same atmosphere for approximately 1 to 2 hours. Finally, the pressure can be greatly reduced to form a vacuum (less than about 15 mm. of Hg pressure) while the temperature is maintained in the same range (225°–310° C.); these conditions are advantageously maintained for approximately 1 to 6 additional hours. This final phase is advantageously carried out with good agitation under the high vacuum in order to facilitate the escape of volatile products from the highly viscous melt. The conditions can be varied considerably depending upon the degree of polyesterification desired, the ultimate properties sought, the stability of the polyester being produced, and the use for which the product is intended.

The reaction can be carried out in the presence or absence of a solvent. Inert, high boiling compounds, such as diphenyl ether, diphenyl, mixed tolyl sulfones, clorinated naphthalene, chlorinated diphenyl, dimethyl sulfolane, etc., can be used as the reaction medium.

In the examples given below, the hot bar sticking temperature is referred to in several instances. The hot bar sticking test can be briefly described as follows: A polyester fiber is placed on the flat surface of a heated bar and a weight of 100 grams is applied to the fiber along a distance of ⅝ inch of the fiber length. The contact surface of this weight has a coating of polytetrafluoroethylene which acts as a thermal insulator. The fiber is allowed to remain in contact with the bar under this weight for one minute. The minimum temperature at which the fiber adheres to the hot bar under these conditions is the sticking temperature as that term is employed in the examples given herein.

This invention can be further illustrated by the following examples; in addition to these examples it is apparent that other variations and modifications thereof can be adapted to obtain similar results:

*Example 1.—Dibutyl tin diacetate as the catalyst*

One hundred grams p,p'-sulfonyldibenzoic acid butyl ester and 45 g. 1,5-pentanediol were placed in a reaction vessel equipped with a stirrer, a short distillation column and an inlet tube for purified nitrogen. One-tenth gram of dibutyl tin diacetate was added and the mixture stirred at 200–210° C. in an atmosphere of purified nitrogen. After one hour, the distillation of butyl alcohol ceased, and the temperature was raised to 275–280° C. where it was held for 20 minutes. A vacuum of 0.5 to 1.0 mm. of Hg pressure was applied for 40–60 minutes while the temperature was maintained at 275–280° C. A colorless product having an inherent viscosity of 0.80–0.90 in 60 phenol-40 tetrachlorethane solution was obtained. Fibers pulled from the melt and cold drawn 400–500% show a sticking temperature of 240–250° C. The product is also useful for films and sheets.

*Example 2.—Diphenyl butyl tin as the catalyst*

0.05 g. of diphenyl dibutyl tin in place of dibutyl tin diacetate was employed in the same process using the same apparatus as in Example 1. A product was obtained having an inherent viscosity of 0.70–0.80.

*Example 3.—Dibutyl tin oxide as the catalyst*

0.06 g. of dibutyl tin oxide in place of dibutyl tin diacetate was employed in the same process using the same apparatus as in Example 1. A product was obtained which was essentially the same as in Example 1.

*Example 4.—Dibutyl tin dichloride as the catalyst*

One hundred grams p,p'-sulfonyl dibenzoic acid ethyl ester and 50 g. of 1,6-hexanediol were placed in a vessel equipped with a variable speed stirrer of the anchor type, a short distillation column, and a gas inlet tube for purified hydrogen. Dibutyl tin dichloride (0.08 g.) was added and the mixture heated at 200–210° for 1 to 1½ hours, in an atmosphere of purified hydrogen. During this time, the distillation of ethyl alcohol from the reaction mixture took place. The temperature was then raised to 270–280° C. and held for 15 minutes. The hydrogen gas was then shut off and a vacuum of about 1 mm. of Hg was applied. The melt rapidly increased in viscosity and the reaction was stopped in 30–40 minutes. The melt was clear and colorless. After cooling slowly, the product obtained is hard and opaque, due to crystallinity. If the melt is suddenly cooled or quenched, it has a tendency to remain amorphous and transparent. On a microscope hot stage in polarized light, the crystalline material shows a melting point of 270–280° C. The inherent viscosity in 60% phenol–40% tetrachlorethane is 0.70–0.80. Fibers can be pulled from the melt and cold drawn 500–600%. They stick to the hot bar at 230–240° C. The polyester can be used to form valuable sheets and films.

*Example 5.—Dibutyl tin dibutoxide as the catalyst*

Forty grams of dimethyl terephthalate and 25 g. of ethylene glycol were placed in reaction vessel as described in Example 1 above. The catalyst, 0.02 g. of dibutyl tin dibutoxide, was added and the mixture stirred at 190–200° C. in a stream of purified hydrogen. After one hour, the methyl alcohol distillation practically ceased, and the temperature was raised to 275° C. where it was held for 10 minutes. A vacuum of 0.5 to 1.0 mm. was applied for 1 to 1½ hours. The product obtained has an inherent viscosity in 60% phenol–40% tetrachlorethane of 0.71.

*Example 6.—Diphenyl dibenzyl tin as the catalyst*

Diphenyl dibenzyl tin (0.02 g.) was employed in the same process using the same apparatus as in Example 5. A product was obtained which was essentially the same as in Example 5.

*Example 7.—Dibutyl tin dilaurate as the catalyst*

Four hundred and twenty grams (1.0 mole) of p,p'-sulfonyldibenzoic acid butyl ester, 58 g. (0.33 mole) of dimethyl adipate, and 250 g. 1,5-pentanediol were placed in a reaction vessel as described in Example 1. Three-tenths of a gram of dibutyl tin dilaurate was added, and the mixture heated and stirred according to the schedule given in Example 1, except that a final temperaure of 260° was employed. The product obtained has an inherent viscosity of 0.82 in 60% phenol–40% tetrachlorethane.

*Example 8.—Dibutyl tin diacetate as the catalyst*

0.2 gram mole of p,p'-dicarboxybiphenyl diethyl ester was used in place of the 100 g. of the p,p'-sulfonyldibenzoic acid butyl ester employed in Example 1 according to the same process in the same apparatus as in Example 1. The product obtained was similar to that described in Example 1 but lower melting.

*Example 9.—Dibutyl tin diacetate as the catalyst*

0.2 gram mole of p,p'-dicarboxydiphenylmethane dibutyl ester was used in place of the p,p'-sulfonyldibenzoic acid butyl ester in Example 1 according to the same process employing the same apparatus as in Example 1. The polyester was similar to that obtained in Example 1 but lower melting.

Example 10.—Dibutyl tin dichloride as the catalyst 100 g. of p,p'-dicarboxydiphenylether diethyl ester was used in place of the p,p-sulfonyldibenzoic acid ethyl ester in Example 4 according to the same process employing the same apparatus as in Example 4. The polyester obtained was similar to that of Example 4 but is lower melting.

Example 11.—Dibutyl tin dichloride as the catalyst

One hundred grams of 1,2-di(p-carboxyphenoxy)ethane diethyl ester and 50 g. ethylene glycol were condensed as described in Example 4 using the same process and apparatus as described in that example. The product was a polyester having a lower melting point than in Example 4.

Example 12.—Dibutyl tin dihcloride as the catalyst

One hundred grams of p,p'-dicarboxydiphenylsulfide dimethyl ester and 50 g. 1,4-butanediol were condensed as described in Example 4 according to the process disclosed therein using the same apparatus. The polyester product obtained was similar to that described in Example 4 but it has a lower melting point, lower viscosity and is generally not as valuable although useful films, sheets, etc. can be prepared therefrom.

Example 13.—Dibutyl tin dibutoxide as the catalyst

One gram mole of p,p'-dicarbethoxydiphenyl methane and 2.1 gram moles of ethylene glycol were condensed in apparatus as described in Example 5 according to the procedure set forth therein employing 0.02 gram of the same catalyst. The product obtained was a highly polymeric linear polyester useful as a molding resin, for preparing films, sheets, etc.

Example 14.—Dibutyl tin dibutoxide as the catalyst

One gram mole of p,p'-dicarbomethoxybenzophenone and 2.4 gram moles of trimethylene glycol were condensed in apparatus as described in Example 5 according to the procedure set forth therein employing 0.02 gram of the same catalyst. The product obtained was a highly polymeric linear polyester useful as a molding resin, for preparing films, sheets, etc.

Example 15.—Dibutyl tin dibutoxide as the catalyst

One gram mole of 1,2-bis(p-carbopropoxyphenoxy) ethane and 2.5 gram moles of tetramethylene glycol were condensed in apparatus as described in Example 5 according to the procedure set forth therein employing 0.02 gram of the same catalyst. The product obtained was a highly polymeric linear polyester useful as a molding resin, for preparing films, sheets, etc.

Polyesters similar to those described in the above examples can be prepared employing 1,4-bis(p-carbamyloxyphenoxy) benzene, bis(p-carbethoxybenzyl)sulfide and N,N - bis(p-carbohexoxyphenyl)methylamine, condensed with ethylene glycol, tetramethylene glycol and hexamethylene glycol.

In the various formulas given for the catalysts in the above examples, $C_4H_9$ and the formulas for other such alkyl radicals are intended to represent the straight chain alkyl radicals. However, branched chain radicals can also be employed.

I claim:

1. A process for preparing a polyester comprising (A) condensing under substantially anhydrous conditions an aromatic dicarboxylic acid diester having the formula:

$$R_1OOC—R_2—X—R_3—COOR_4$$

wherein $R_1$ and $R_4$ each represents a substituent selected from the group consisting of an alkyl radical containing from 1 to 10 carbon atoms and an omega-hydroxyalkyl radical containing from 2 to 12 carbon atoms, $R_2$ and $R_3$ each represents $(CH_2)_{n-1}$ wherein $n$ is a positive integer of from 1 to 5 inclusive, and X represents a divalent aromatic radical selected from the group consisting of those having the following formulas:

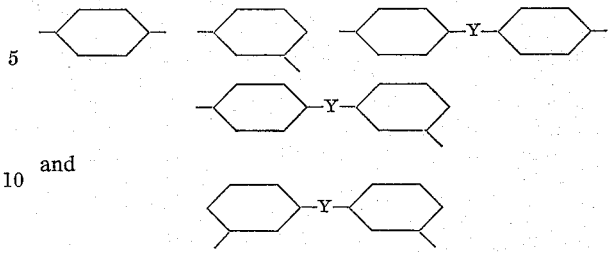

and

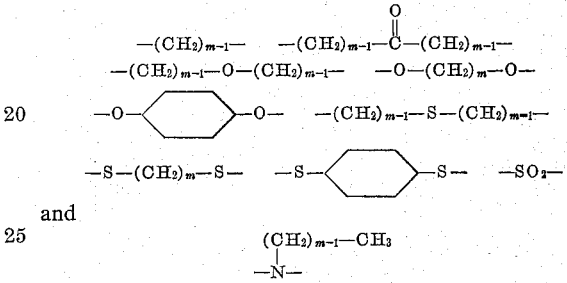

wherein Y represents a divalent radical selected from the group consisting of

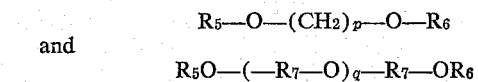

and

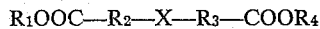

wherein $m$ is a positive integer of from 1 to 5 inclusive, (B) with an alpha, omega-dioxy compound comprising a compound selected from the group consisting of those compounds having the following formulas:

$$R_5—O—(CH_2)_p—O—R_6$$

and $$R_5O—(—R_7—O)_q—R_7—OR_6$$

wherein $p$ represents a positive integer of from 2 to 12 inclusive, $R_5$ and $R_6$ each represents a substituent selected from the group consisting of a hydrogen atom and an acyl radical containing from 2 to 4 carbon atoms, $R_7$ represents an alkylene radical containing from 2 to 4 carbon atoms and $q$ represents a positive integer of from 1 to 10 inclusive, the alpha, omega-dioxy compound being employed in such a proportion that there is at least an equivalent amount of alpha and omega oxy substituents in proportion to the carbalkoxy substituents in the overall combination of the aromatic diester and the alpha, omega-dioxy compound, (C) in the presence of a catalytic condensing agent which is an organo-tin compound selected from the group consisting of those compounds having the following formulas:

$$M_2(Sn(OR)_4)$$
$$MH(Sn(OR)_4)$$
$$M'(Sn(OR)_4)$$
$$M'(HS_n(OR)_4)_2$$
$$M_2(Sn(OR)_6)$$
$$MH(Sn(OR)_6)$$
$$M'(Sn(OR)_6)$$
$$M'(HSn(OR)_6)_2$$
$$Sn(OR)_2$$
$$Sn(OR)_4$$
$$SnR'_2$$
$$SnR'_4$$
$$R'_2SnO$$

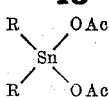

wherein M represents an alkali metal, M′ represents an alkaline earth metal selected from the group consisting of magnesium, calcium and strontium, R represents an alkyl radical containing from 1 to 8 carbon atoms, R′ represents a substituent selected from those consisting of an alkyl radical containing from 1 to 8 carbon atoms and an aryl radical of the benzene series containing from 6 to 9 carbon atoms, and Ac represents an acyl radical derived from an organic acid containing from 2 to 18 carbon atoms, (D) at an elevated temperature which is increased gradually during the course of the condensation up to a temperature of from about 225° to about 310° C., (E) the condensation being conducted in an inert atmosphere, (F) and conducting the condensation at a very low pressure of the inert atmosphere during the latter part of the condensation.

2. A process as defined in claim 1 wherein the condensing agent is employed in an amount of from about 0.005% to about 0.2% based on the weight of the aromatic dicarboxylic acid diester.

3. A process as defined in claim 2 wherein the alpha, omega-dioxy compound is employed in such a proportion that there are from about 1.2 to about 3 alpha and omega oxy substituents in proportion to the carbalkoxy substituents in the overall combination of the aromatic diester and the alpha, omega-dioxy compound.

4. A process as defined in claim 3 wherein the elevated temperature employed during the earlier part of the condensation is from about 150° C. to about 220° C.

5. A process as defined in claim 4 wherein the low pressure defined under (F) is less than 15 mm. of Hg pressure.

6. A process as defined in claim 5 wherein the low pressure defined under (F) is less than 5 mm. of Hg pressure.

7. A process as defined in claim 6 wherein the aromatic diester is derived from p,p′-sulfonyl dibenzoic acid and the condensing agent is dibutyl tin diacetate.

8. A process as defined in claim 6 wherein the aromatic diester is derived from p,p′-sulfonyl dibenzoic acid and the condensing agent is diphenyl dibutyl tin.

9. A process as defined in claim 6 wherein the aromatic diester is derived from p,p′-sulfonyl dibenzoic acid and the condensing agent is dibutyl tin oxide.

10. A process as defined in claim 6 wherein the aromatic diester is derived from p,p′-sulfonyl dibenzoic acid and the condensing agent is dibutyl tin dichloride.

11. A process as defined in claim 6 wherein the aromatic diester is derived from terephthalic acid and the condensing agent is dibutyl tin dibutoxide.

12. A process as defined in claim 1 wherein the aromatic dicarboxylic acid diester is formed by a preliminary step comprising condensing an aromatic dicarboxylic acid having the formula:

$$\text{HOOC}-R_2-X-R_3-\text{COOH}$$

wherein $R_2$, $R_3$ and X are defined under (A), with an alpha, omega-dioxy compound which is defined under (B) and is employed in the proportions set forth under (B), at an elevated temperature, after which preliminary step the catalytic condensing agent which is defined under (C) is added and the condensation is completed as defined under (D), (E) and (F).

13. A process as defined in claim 12 wherein the elevated temperature employed during the preliminary step is substantially that at which reflux conditions subsist, and the condensing agent is employed in an amount of from about 0.005% to about 0.2% based on the weight of the aromatic dicarboxylic acid diester, the alpha, omega-dioxy compound is employed in such a proportion that there are from about 1.2 to about 3 alpha and omega oxy substituents in proportion to the acid substituents in the overall combination of the aromatic diester and the alpha, omega-dioxy compound, the elevated temperature employed during the earlier part of the condensation to form the polyester is from about 150° C. to about 220° C., the low pressure defined under (F) is less than about 15 mm. of Hg pressure and all materials employed in the process are substantially anhydrous.

References Cited in the file of this patent

UNITED STATES PATENTS

| | | |
|---|---|---|
| 2,257,384 | Johnston | Sept. 30, 1941 |
| 2,267,777 | Yngve | Dec. 30, 1941 |
| 2,307,092 | Yngve | Jan. 5, 1943 |
| 2,465,319 | Whinfield et al. | Mar. 22, 1949 |
| 2,583,084 | Burt | Jan. 22, 1952 |
| 2,614,120 | Caldwell | Oct. 14, 1952 |